United States Patent [19]
Jinsenji

[11] 3,942,743
[45] Mar. 9, 1976

[54] INFORMATION TAPE CASSETTE
[75] Inventor: Sei Jinsenji, Yokohama, Japan
[73] Assignee: Ricoh Company, Ltd., Tokyo, Japan
[22] Filed: July 24, 1974
[21] Appl. No.: 491,229

[30] Foreign Application Priority Data
July 26, 1973 Japan.............................. 48-84648

[52] U.S. Cl. ............................................. 242/192
[51] Int. Cl.² ...................... G03B 1/04; G11B 15/32
[58] Field of Search................... 242/192, 54.1, 67.5

[56] References Cited
UNITED STATES PATENTS

| | | | |
|---|---|---|---|
| 2,743,878 | 5/1956 | Masterson............................ | 242/192 |
| 3,154,308 | 10/1964 | Faulkner.......................... | 242/192 X |
| 3,467,338 | 9/1969 | Breuer................................ | 242/192 |
| 3,526,371 | 9/1970 | Blackie et al........................ | 242/192 |
| 3,544,038 | 12/1970 | Smith................................ | 242/192 |

FOREIGN PATENTS OR APPLICATIONS
414,714  8/1946  Italy.................................. 242/192

*Primary Examiner*—Leonard D. Christian
*Attorney, Agent, or Firm*—Cooper, Dunham, Clark, Griffin & Moran

[57] ABSTRACT

A tape cassette which automatically brings the tape into direct engagement with the detection head and into indirect engagement with the drive wheel of a machine when the tape cassette is pushed in one direction into the machine. Disposed in the cassette is a rotary roller which is brought, at the flanges provided on its outer periphery, into engagement with the drive wheel and driven thereby. The rotary roller cooperates with other guide members to maintain at the appropriate tension an endless belt which backs up the inner side of a portion of the tape which is paid out from one of the cores and wound onto the other core.

8 Claims, 6 Drawing Figures

INFORMATION TAPE CASSETTE

BACKGROUND OF THE INVENTION

This invention relates to a cassette for holding therein an information tape, such as a magnetic tape or optical tape.

The practice of holding a tape of this type in a cassette has become popular in view of the ease with which the tape can be handled. In many types of cassettes now available, the cores on which the tape is wound are driven directly. Because of this, it is necessary to provide the cassette with a sturdy tubular shaft portion for receiving therein the drive shaft of a tape player or other machine, which hampers miniaturization. Moreover, in the cassettes of the prior art, the operation of connecting the drive shaft of the machine to the tubular shaft portion of the cassette and the operation of bringing the read-out element into engagement with the tape must be performed separately because the cassette must be moved in different directions in performing these operations. Thus, the operator is required to perform two operations, thereby reducing the operational efficiency of the cassettes.

In order to obviate defects of the prior art, proposals have been made to eliminate the tubular shaft portion of the cores by frictionally driving the tape by an endless belt which is moved with the tape. In cassettes of this type, the endless belt is merely brought into engagement with the tape which is wound on the cores. By this arrangement, however, it is impossible to obtain a sufficiently high frictional force, and it becomes necessary to use an additional tape tensioning means.

SUMMARY OF THE INVENTION

This invention has as its object the provision of an information tape cassette in which an endless belt engages the rolls of tape on the cores, and extends between two adjacent corners of the cassette. The free run of the tape, connecting the two rolls, overlaps the run of the extending portion of the endless belt. The frictional engagement of the belt with the rolls of tape on the cores and with the free run of the tape is used in driving the tape past a magnetic head.

In the cassette according to the invention, the tubular shaft for bringing the drive shaft into engagement with the cores can be eliminated, and each core is provided with a shaft for winding the tape thereon. This is reduces both the cost and the thickness of the cassette. Since the operation of bringing the tape into engagement with the drive member and the operation of bringing the tape into engagement with the read-out element can be performed by moving the cassette in one direction, only insertion of the cassette according to the invention into a cassette player or other machine can be effected in a single operation.

In the cassette according to the invention, the endless belt and the tape can be tensioned satisfactorily by the radially directed tension of the tape wound in roll form on the cores. This eliminates the need to use additional tensioning means, and facilitates retrieval of the desired information by moving the tape at a constant speed or moving the same in the normal or reverse direction.

DESCRIPTION OF PREFERRED EMBODIMENTS

Figure 1:
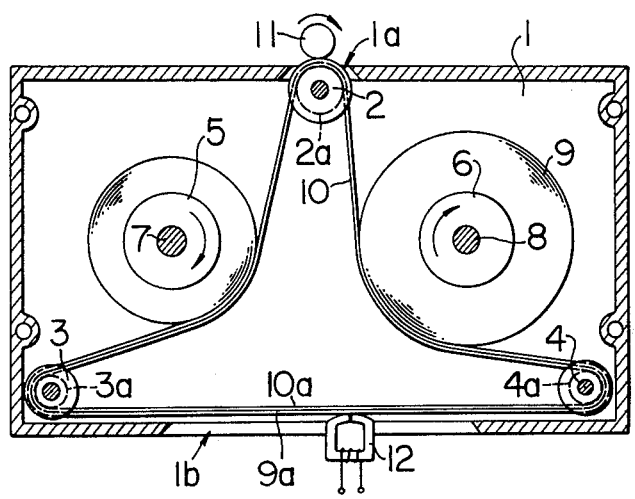
FIG. 1 is a tranverse sectional view of the information tape cassette comprising one embodiment of the invention.

In FIG. 1, a cassette case 1 comprises a guide roller 2 rotatably mounted in its central upper portion and guide rollers 3 and 4 rotatably mounted in its left and right lower portions. Each of the guide rollers 2, 3 and 4 is formed on its outer periphery with corresponding peripheral grooves 2a, 3a and 4a thus providing on each a pair of flanges. Cores 5 and 6 for winding a tape 9 thereon are rotatably supported by shafts 7 and 8 and disposed leftwardly and rightwardly of the central portion of the cassette case 1 respectively. The guide rollers 3 and 4 are disposed outwardly of the shafts 7 and 8 respectively.

Figure 2:
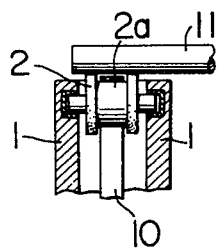
FIG. 2 is a fragmentary sectional view showing the manner in which the flanges provided on the outer periphery of the rotary roller are engaged by the drive roller.
Figure 3:
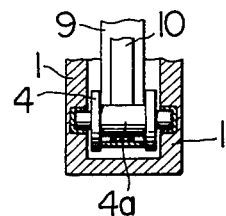
FIG. 3 is a fragmentary sectional view showing the tape and the endless belt in engagement with each other.

The tape has opposite ends which are fixed to the cores 5 and 6, and the tape 9 is wound on the two cores in roll form. An endless belt 10 is trained about the guide rollers 2, 3 and 4 and received in the peripheral grooves 2a, 3a and 4 thereof. The belt 10 is maintained in pressing engagement with the tape 9 wound on the cores 5 and 6 in roll form. The tape 9 has a paid-out free portion 9a which unwinds from one of the cores 5 and 6 and is rewound on the other core. The paidout free portion 9a of the tape 9 overlaps a portion 10a of the belt 10 which forms a bottom run extending between the bottom guide rollers 3 and 4. As shown in FIG. 2 and FIG. 3, the peripheral groove 2a of the roller 2 has the same with as the endless belt 10, while the peripheral grooves 3a and 4a of the guide rollers 3 and 4 respectively have the same width as the tape 9.

The length and resilience of the endless belt 10, which may be made of rubber, polyester or the like, are chosen so that the belt is maintained at all times in pressing engagement with the tape on the cores.

The case 1 is formed with a drive roller opening 1a and a record read-out element opening 1b in the upper portion and the lower portion thereof respectively as seen in FIG. 1. The pair of flanges provided on the outer periphery of the guide roller 2 stick outwardly of the case 1 through the opening 1a and are engaged by the drive roller 11 of the machine when the cassette is inserted in the machine. A record read-out element 12, such as a magnetic head, can be disposed in the opening 1b and brought into engagement with the free tape portion 9a. Because of the resilience of the endless belt 10, the free tape portion 9a is kept in engagement with the element 12. This eliminates the need to use a backup roller or the like which is used in the prior art.

Figure 4:
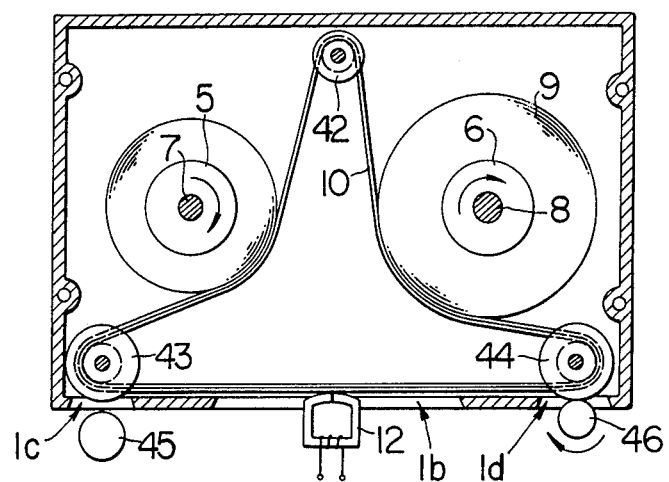
FIG. 4 is a transverse sectional view of the information tape cassette comprising another embodiment of the invention.
Figure 5:
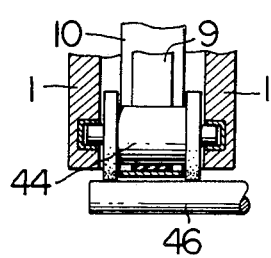
FIG. 5 is a fragmentary sectional view showing the manner in which the tape and the endless belt are driven.

FIG. 4 shows another embodiment of the invention which is similar to the first embodiment in that the endless tape 10 is trained about three guide rollers 42, 43 and 44, but which differs therefrom in that the rollers 43 and 44 are disposed in drive roller openings 1c and 1d respectively which are formed on the same side of the case 1 as the record read-out element opening 1b and disposed on the left side and right side of the opening 1b. The guide rollers 43 and 44 are disposed in positions corresponding to those of drive rollers 45 and 46 respectively, with the drive rollers 45 and 46 being adapted to be alternately brought into driving engagement with the guide rollers 43 and 44 respectively. In this embodiment, the rollers 43 and 44 are each formed with a peripheral groove which has the same width as the tape 10 (See FIG. 5.). The drive rollers 45 and 46 are adapted to rotate in opposite directions. Thus, by alternately bringing the drive rollers 45 and 46 into engagement with the guide rollers 43 and 44 respectively, it is possible to move the tape in opposite directions or in the normal and reverse directions. In this embodiment, the drive rollers 45 and 46 are disposed on the same side as the record read-out element 12. This facilitates insertion of the cassette in a machine and initiation of the operation of recording or reading information stored on the tape.

Figure 6:
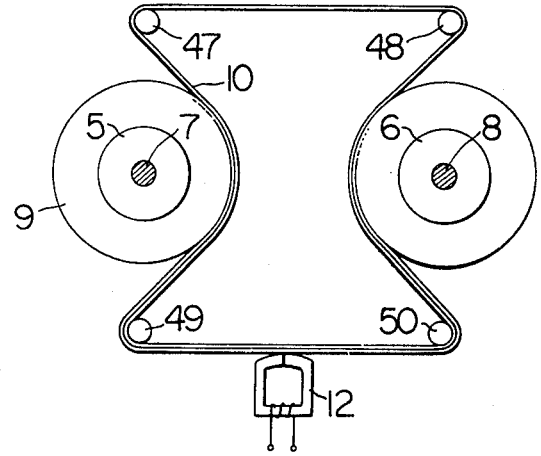
FIG. 6 is a schematic view of the information tape cassette comprising another embodiment of the invention.

FIG. 6 shows still another embodiment of the invention in which the endless belt 10 is trained about four guide rollers 47, 48, 49 and 50 and the rolls of tape engage the right and left vertical runs of the tape 10. The record read-out element 12 engages the paid-out free portion of the tape 10 as is the case with the aforementioned embodiment. In positions where the tape 9 overlaps the endless belt 10, the guide rollers are disposed outwardly of the shafts 7 and 8 of the cores 5 and 6 on which the tape is wound in roll form, so that the paid-out free portion of the tape can be properly tensioned by the resilience of the rolls of tape on the cores.

In the aforementioned description, the invention has been shown and described as using a plurality of guide rollers. It is to be understood that the invention is not limited to the use of guide rollers alone and that some of the guide rollers may be replaced by a suitable number of sleeves, guide plates or other guide members.

I claim:

1. An information tape cassette for a machine having a tape head and a driving capstan, said cassette comprising a case formed therewith with a first, a second and a third opening, wherein when the cassette is positioned in the machine said first opening faces the tape head, said second opening faces the driving capstan, and said third opening faces a different possible location for a driving capstan, a pair of cores rotatably disposed in said case and each having means for securing thereto one end of a continuous length of a tape so that the tape can be wound on the cores in roll form and a paid-out portion of the tape can connect the rolls of tape wound on the cores, and an endless belt and means for confining the belt to move along a path in which the belt backs said paid-out portion of the tape and brings said paid-out tape portion into a position in which it faces said first opening of the case so as to be engaged by the head facing said first opening from outside the case when the cassette is positioned in the machine, said belt partially engaging under a predetermined tension a portion of the outer periphery of each of the rolls of said tape formed on said cores, said confining means comprising a plurality of guide members arranged such that the endless belt trained about said guide members can move along said path, said guide members comprising at least a first and a second rotary roller arranged such that the endless belt is trained over said rollers, with the paid-out portion of the tape being over the belt portions trained on the rollers, and said first and second rollers face and are adjacent to said second and third case openings respectively, said first roller engaging said driving capstan when the cassette is in position in the machine and said second roller being disposed to engage a driving capstan disposed at said different location, whereby the first rotary roller can be driven by said driving capstan and said second rotary roller can be engaged and driven by another driving capstan in the same or a different machine.

2. An information tape cassette as in claim 1 where all of the openings are at a single side of the case.

3. An information tape cassette as in claim 1 wherein each of said rotary rollers is formed on its outer periphery with a pair of flanges extending radially outwardly of the belt and tape portions trained over the roller for frictional engagement of the flanges with a driving capstan, without engagement of the driving capstan with the tape or belt.

4. An information tape cassette as in claim 1 wherein said endless belt is made of a resilient material.

5. A tape cassette for a tape machine having a tape head and tape driving means, said cassette comprising: a case having a plurality of side openings and a side aperture; a pair of spaced-apart cores rotatably mounted in the case, each core having means for securing thereto one end of a continuous length of tape which can be wound in roll form on each core so as to leave a paid-out tape portion connecting the rolls of tape wound on the cores; a plurality of guide rollers rotatably mounted in the case, each guide roller being adjacent to and facing a different one of said case openings; an endless belt trained on said guide rollers and engaging each of the rolls of tape on said cores at a predetermined tension, said endless belt further engaging the paid-out tape portion at a location adjacent to and facing said case aperture, with the paid-out tape portion being between the belt and each opening and between the belt and the aperture, whereby the paid-out tape portion can be accessed through said aperture by said head from outside the case and any of said guide rollers can be accessed by said tape driving means through any of said openings to thereby rotate the rolls of tape wound on the cores and to move the paid-out tape portion with respect to said case aperture and said tape head.

6. A tape cassette as in claim 5 wherein each guide roller is rotatably mounted in the case and comprises a spool-like structure having a lesser diameter central portion and greater diameter axially-spaced flanges, said belt frictionally engaging said central portions of the rollers and the engaging portion of the belt being spaced radially inwardly from the flange periphery.

7. A tape cassette as in claim 6 wherein said openings and said aperture in the case are located at opposite sides of the case.

8. A tape cassette as in claim 6 wherein said openings and aperture are along the same side of the case.

* * * * *